United States Patent
Phelps, III et al.

(10) Patent No.: US 7,198,223 B2
(45) Date of Patent: Apr. 3, 2007

(54) ULTRALIGHT COAXIAL ROTOR AIRCRAFT

(75) Inventors: Arthur E. Phelps, III, Williamsburg, VA (US); Dwaine R. Barnes, Midland, TX (US); Elwood G. Norris, Poway, CA (US); Eugene F. Rock, New Port News, VA (US); Emitt Wallace, Carrollton, VA (US)

(73) Assignee: Airscooter Corporation, Henderson, NV (US)

( * ) Notice: Subject to any disclaimer, the term of this patent is extended or adjusted under 35 U.S.C. 154(b) by 0 days.

(21) Appl. No.: 10/077,169

(22) Filed: Feb. 14, 2002

(65) Prior Publication Data

US 2002/0125368 A1 Sep. 12, 2002

Related U.S. Application Data

(60) Provisional application No. 60/268,978, filed on Feb. 14, 2001.

(51) Int. Cl.
B64C 27/10 (2006.01)

(52) U.S. Cl. .................................... 244/17.11

(58) Field of Classification Search ............ 244/17.25, 244/17.23, 4 A, 17.11, 17.19, 17.27, 93, 234, 244/114, 226, 87, 105, 194; 416/88, 89, 416/128, 129; 446/61, 68
See application file for complete search history.

(56) References Cited

U.S. PATENT DOCUMENTS

| | | | |
|---|---|---|---|
| 1,378,112 A | * | 5/1921 | Hewitt |
| 1,568,765 A | | 1/1926 | Ortego |
| 1,849,235 A | | 3/1932 | Kibbe |
| 1,887,429 A | | 11/1932 | Price |
| 2,074,342 A | | 3/1937 | Platt |
| 2,156,334 A | * | 5/1939 | De Bothezat |
| 2,318,260 A | * | 5/1943 | Sikorsky ................. 244/17.21 |
| 2,388,653 A | | 11/1945 | Hays |
| 2,395,610 A | | 12/1946 | Cavallaro |
| 2,480,806 A | | 8/1949 | Desmoulins |
| 2,486,059 A | | 10/1949 | Penecost |
| 2,496,857 A | | 2/1950 | Cronstedt et al. |
| 2,532,683 A | * | 12/1950 | Traver |
| 2,578,680 A | * | 12/1951 | Erickson |
| 2,667,227 A | * | 1/1954 | Laskowitz ................. 415/115 |
| 2,677,431 A | | 5/1954 | Prince |
| 2,698,147 A | * | 12/1954 | Hovgard ..................... 244/7 R |
| 2,835,331 A | * | 5/1958 | Ryan et al. |
| 3,096,953 A | | 7/1963 | Koump |

(Continued)

FOREIGN PATENT DOCUMENTS

| | | | | |
|---|---|---|---|---|
| DE | 3729231 | * | 3/1989 | .............. 244/17.11 |
| DE | 195 40 272 A1 | | 10/1995 | |

*Primary Examiner*—Tien Dinh
(74) *Attorney, Agent, or Firm*—Thorpe North & Western, LLP

(57) ABSTRACT

An ultralight coaxial dual rotor helicopter having a substantially L shaped frame. Attached to the back of the frame is a vertical shaft engine, and a pair of yaw paddles for controlling yaw of the craft. The drive shaft connects to a belt drive at the top of the frame, which transmits the engine power to a transmission and coaxial drive gear for driving the rotors. Crank actuators are provided for tilting the rotor axis to control the pitch and roll of the craft. A pilot seat and ballast tank are attached to the front of the frame. The ballast tank may be filled with a volume of water to balance the craft for the weight of the pilot. The fuel tank is located behind the pilot seat on the centerline of the helicopter, such that as fuel is used and the weight of fuel in the tank changes, the balance of the craft will not be affected.

16 Claims, 14 Drawing Sheets

U.S. PATENT DOCUMENTS

| | | |
|---|---|---|
| 3,135,481 A | 6/1964 | Sudrow |
| 3,360,219 A * | 12/1967 | Wigal |
| 3,417,825 A * | 12/1968 | Ramme |
| 3,474,987 A | 10/1969 | Meditz |
| 3,554,467 A | 1/1971 | Yowell |
| 3,690,597 A | 9/1972 | Di Martino |
| 3,765,622 A | 10/1973 | Haines |
| 3,921,939 A * | 11/1975 | Garfinkle .................. 244/17.25 |
| 4,084,345 A | 4/1978 | Tanaka |
| 4,301,981 A * | 11/1981 | Hartt .......................... 244/12.2 |
| 4,531,692 A * | 7/1985 | Mateus ..................... 244/17.19 |
| 4,828,205 A * | 5/1989 | Durand ..................... 244/17.23 |
| 4,913,376 A | 4/1990 | Black |
| 4,928,907 A | 5/1990 | Zuck |
| 5,039,031 A | 8/1991 | Valverde |
| 5,058,824 A | 10/1991 | Cycon |
| 5,065,959 A | 11/1991 | Bhatia et al. |
| 5,149,012 A | 9/1992 | Valverde |
| 5,167,384 A | 12/1992 | Krepak |
| 5,215,502 A * | 6/1993 | Neathery et al. .............. 464/71 |
| 5,259,729 A | 11/1993 | Fujihira et al. |
| 5,284,454 A | 2/1994 | Randolph |
| 5,344,100 A | 9/1994 | Jaikaran |
| 5,370,341 A | 12/1994 | Leon |
| 5,381,985 A | 1/1995 | Wechsler et al. |
| 5,383,810 A | 1/1995 | Loving |
| 5,556,355 A | 9/1996 | Ostrowski |
| 5,791,592 A | 8/1998 | Nolan |
| 5,810,560 A * | 9/1998 | Tanaka ........................ 416/27 |
| 5,915,649 A | 6/1999 | Head |
| 6,065,718 A * | 5/2000 | Piasecki .................. 244/17.11 |
| 6,182,923 B1 | 2/2001 | Weinhart |
| 6,293,492 B1 | 9/2001 | Yanagisawa |

* cited by examiner

ULTRALIGHT COAXIAL ROTOR AIRCRAFT

This application claims priority of U.S. provisional application Ser. No. 60/268,978, filed Feb. 14, 2001, which is hereby incorporated herein by reference for the teachings consistent herewith, and this disclosure shall control in case of any inconsistency.

BACKGROUND OF THE INVENTION

1. Field of the Invention

This invention relates to coaxial helicopter systems. More particularly, the present invention relates to an ultralight coaxial helicopter system.

2. Discussion of the Related Art

Coaxial helicopters were first developed, in the form of small devices used as toys and curiosities, centuries ago. The earliest attempts at designing a practical helicopter focused on coaxial rotors and dual counter-rotating arrangements. Later, what has come to be thought of as conventional helicopter designs were developed. These were single-rotor helicopters, and it was found that they needed a long tail boom having a tail rotor at the end rotating in a plane roughly perpendicular to the plane of rotation of the main rotor, in order to apply a consistent counter-reaction moment force to counteract the rotational reaction forces arising from powering the single rotor. These reaction forces tend to make the airframe of the helicopter rotate in a direction opposite that of the direction of rotation of the rotor. Without the tail rotor to provide the counter-moment, the airframe could rotate uncontrollably once airborne due to these reaction forces. This need for a tail rotor has given us the readily-recognized shape of conventional single-rotor helicopters including the long tail boom with a tail rotor at the aft end.

As mentioned, earlier it was theorized and proven that a helicopter with two counter-rotating rotors could be built such that the rotational force of one rotor counteracts the rotational reaction force of the other, leaving the helicopter body stable without the need for a perpendicularly acting tail rotor. The first controllable man-carrying helicopters were tandem-rotor designs. Tandem-rotor helicopters remain the most common dual-rotor helicopters.

Tandem-rotor helicopters such as the CH-46 Chinook aircraft manufactured by Boeing Aircraft Corp. of Seattle, Wash. have been found to be particularly useful for heavy lifting operations and otherwise where a large payload capacity is needed. Conventional tandem-rotor helicopters typically have an elongate body with a first rotor atop the front end, and a second rotor atop the rear end. The rotors can be elevationally offset so as to avoid contact with each other when rotating, or they may be separated by a sufficient distance to prevent contact. They may also be configured with a rotor indexing means which allows the rotor blades to intermesh during rotation and at the same time keeps them from coming into contact with each other. This later configuration is sometimes analogized to, and referred to as, an "eggbeater" arrangement.

Dual-rotor helicopters with coaxial rotors have also been developed. These helicopters include two counter-rotating rotors mounted on a single axis. While, as mentioned, coaxial helicopters have been known for many years, development of this type of aircraft has heretofore been limited because of complexities involved in arrangements for control of the rotor blades to give roll, pitch and yaw control. In conventional coaxial designs at least two swashplate assemblies are provided to provide collective and cyclic pitch control on both rotors. A substantially conventional swash plate is provided below a lower rotor; and a swash plate assembly incorporating two counter-rotating swashplate portions is provided between the upper and lower rotors. Associated control links, push rods, etc. are needed, all so that cyclic and collective pitch control inputs to the upper rotor can be transferred past the counter-rotating lower rotor. As is known, using this arrangement it is a daunting task to provide a reliable aircraft without unduly burdensome maintenance requirements. The control arrangements are necessarily complex, and relatively high forces must be transferred by the swashplate assemblies and control links, so they must be robust, and accordingly, heavy. This arrangement does not allow differential collective to be applied for yaw control, and so a further means for yaw control is typically provided. This can be in the form of additional collective control links and mixing arms, adding a yaw fan, or making the swash plates movable with respect to each other, etc, but additional structure (with attendant additional weight) typically is included to provide this differential collective control.

For these reasons, and others, in smaller helicopters conventional single-rotor designs, having a tail rotor for yaw control and for counteracting the tendency of the airframe to turn with respect to the rotor, predominate. Nevertheless, several successful coaxial designs have been developed, for example, by Nikolai Kamov and the Kamov design bureau of the former Soviet Union. The Kamov Company organization of Lubertsy, Moscow Region, Russia continues to successfully design and produce coaxial helicopters. Other coaxial designs exist, for example a small coaxial pilotless craft developed by the Sikorsky division of United Technologies Corporation, of Hartford Conn. An example of a control system for this latter craft is disclosed in U.S. Pat. No. 5,058,824. Another example is the XH-59 ABC technology demonstrator helicopter, also built by the Sikorsky division.

All aircraft, helicopters included, require control of attitude (including pitch, roll, and yaw), and linear motion (speed). The main rotor of a conventional single-rotor helicopter is typically configured to vary the pitch of the rotor blades cyclically and/or collectively to control pitch, roll, and lift, and therefore forward motion (or reverse, or side-to-side motion). Collective blade pitch control of the tail rotor controls yaw. The power output of the engine may also be varied, albeit within a fairly narrow operational power band, and this can affect lift and yaw.

In a conventional tandem-rotor and coaxial helicopters, these same attitude and lift controls are effected by cyclic and/or collective pitch variation of the blades of both rotors. Yaw control is by differential collective control inputs to the counter-rotating rotors, causing one to have more drag and the other less, thereby turning the aircraft about the yaw axis.

Coaxial helicopters potentially present many advantages over conventional single- and tandem-rotor helicopter designs. They can be more compact than a single-rotor design because of higher disk loading, and the fact that they have no need for a tail rotor for counter-acting the tendency of the airframe to turn around the rotor axis in reaction to the torque input to the rotor. Coaxial designs are more compact than tandem and eggbeater designs because there is no need to separate the rotors except for vertical rotor clearance. Because of said higher disk loading, coaxial designs can provide a given desired lifting force using a smaller diameter rotor set than comparable single-rotor helicopters. They typically require a smaller airframe than a comparable eggbeater or tandem-rotor helicopter. Moreover, because the rotors of a coaxial helicopter are disposed one on top of the other, and are counter-rotating, power efficiency losses due to vortex air movement adjacent the upper rotor can be at least partially recovered in increased effective airspeed and lift in the lower rotor. In other words, the upper rotor gives the air a swirl in one direction, and the lower rotor swirls it in the other, canceling out a good part of the imparted vortex air movement. Also, elimination of the tail rotor frees up the engine power otherwise diverted there. This savings has been cited as up to about 30% of total engine power output in some cases.

However as noted above, there is a trade-off for these advantages, in that providing for the control of coaxial rotor helicopters presents additional complexities and increased swashplate, linkage, and rotor weight and increased maintenance concerns. One approach to mitigating the disadvantages of a coaxial arrangement is to eliminate the need for swashplates and complex control linkages altogether. Rather than adjusting the pitch of the coaxial rotor blades, an alternative for controlling coaxial helicopters is to make the axis of rotation of the coaxial rotor set tiltable with respect to the airframe, allowing pitch and roll control by effectively shifting the center of weight of the aircraft with respect to the thrust vector of the coaxial rotor set. Such a system is disclosed, for example, in U.S. Pat. No. 5,791,592 to Nolan, et al. (1998). In this simplified system, there is no need for cyclic blade pitch control, and there is no collective pitch control. Tilt of the coaxial rotor set, and increasing or decreasing the speed of the rotors, provides pitch, roll and lift control. Since, as mentioned, the disk loading in coaxial helicopters is higher, and rotor diameter is smaller than conventional designs, adequate control of lift is possible without collective blade pitch control, though some lag in response is deemed inherent, and should be taken into account by a pilot operating a helicopter of this design.

Yaw control in the Nolan device is by means of two sets of airfoils which are tiltable. The airfoil sets tilt with respect to two sets of axes. One set of axes is roughly parallel, and the other is normal, respectively, to the rotor thrust vector when the airfoils are vertically oriented. A larger airfoil set rotates about axes normal to the thrust vector, and impinges on the downwash from the rotor set. As the airfoils tilt to the right or left from a roughly vertical neutral orientation, this creates a reaction force vector tending to yaw the airframe right or left, depending on the angular direction of tilt of the larger set of airfoils. The second set of airfoils, which are smaller, and depend rudder-like from a rear edge of the larger airfoils, turn back and forth about the axis parallel to the thrust vector when the larger airfoils are upright. The second set of airfoils appear to function in a manner similar to a tail rudder in a conventional aircraft, and therefore appear from the disclosure to be more effective in yaw control when the device has developed significant forward speed, and to be less effective in yaw control when the helicopter is hovering at a stationary point, or otherwise has very low forward speed.

With this background, it has been recognized by the inventors that for all the potential advantages of coaxial designs, heretofore there has not been developed a coaxial rotor aircraft in the ultralight class (as defined by FAA regulations e.g. 14 C.F.R. §103) which provides acceptable flight characteristics at low cost. Known ultralight helicopters are of single-rotor design. Such known ultralight helicopters essentially mimic full-size conventional helicopter propulsion and control systems, and tend to be expensive.

SUMMARY

It has been recognized that simplifications in design, and the weight and cost savings realized thereby, and commensurate potential advantages in performance for the same cost, argue for a simplified coaxial-rotor helicopter for an ultralight design. The present invention is directed to this end.

The present invention accordingly provides an ultralight coaxial helicopter comprising a substantially L-shaped frame with a tiltable coaxial rotor set disposed thereon and tiltably connected thereto. Also carried by the frame is at least one yaw paddle disposed in a downwash from the rotor set. The one or more yaw paddles are tiltable and otherwise configured so as to provide yaw control. Such yaw control from these paddles can be obtained both in hover and in translational flight.

In a more detailed aspect, actuators, which are configured to be controllable by a helicopter operator also carried by the L-shaped frame, are provided for tilting the rotor set axis relative to the frame to control the pitch and roll attitude of the craft by moving the center of gravity of the craft relative to the thrust vector of the rotor set. In further detail, a bottom portion of the frame can extend forwardly to support an operator, and attached to a rear portion of the L-shaped frame is a vertical-shaft internal combustion engine for providing power to the rotor set through a damper, clutch, belt drive, and a constant velocity (CV) joint at the tiltable connection of the rotor set to the frame. A transmission is mounted above the tiltable connection and is configured for providing counter-rotating shafts and comprises a pair of counter-rotating bevel gears operatively coupled to the respective shafts, and further comprises a plurality of beveled pinion gears disposed between the bevel gears.

In a further more detailed aspect, a pair of yaw paddles extend from the back of the airframe for controlling yaw of the craft as mentioned. These yaw paddles can be configured so as to provide drag during forward flight to limit airspeed, and to improve directability and controllability of the helicopter. In addition, two or more paddles can be provided. Providing a pair of paddles allows their plan form area to be reduced, reducing their susceptibility to yawing the aircraft in cross-winds, while maintaining the same surface area to interact with rotor set downwash.

In another more detailed aspect, a pilot seat and a provision for removable ballast are attached to the lower front of the L-frame. One means of providing ballast is to provide a fluid ballast tank at the front of a short boom attached to the frame. The ballast tank may be filled with a selected volume of water to balance the craft and account for differences in the weight of different individual pilots. A fuel tank is located behind the pilot seat, and on or adjacent to a center of gravity of the helicopter, and substantially directly below the rotational axis of the rotors. This is done so that as fuel is used and the weight of fuel in the tank changes, the overall weight balance of the craft will not be noticeably affected.

In another more detailed aspect, pilot input can be through a control which can further comprise a handlebar-like yoke, and a throttle lever. The throttle lever can be a separate control or incorporated in the yoke, for example by replacing it with a rotatable handgrip as is commonly used in motorcycle throttles. The handlebar-like yoke can be turned like a scooter handlebar for yaw input, pushed forwardly and rearwardly for pitch input, and tipped side-to-side for a roll input.

In another more detailed aspect, the control system can be configured to keep the pilot aware of altitude and to keep the forward speed of the aircraft below a threshold value, so that the aircraft stays low to the ground and relatively slow in relative speed to mitigate harm to the operator from a crash. Furthermore, an emergency power system can be provided to provide temporary power to the rotors for landing in the event of sudden loss of engine power. This system can be powered by stored compressed air, or by another gas generated rapidly from a chemical gas generator triggered by a power failure. Further, additional safety provisions can include providing pontoons with blow-out plugs to mitigate a hard landing in a crash, providing a ground echo location capability and one or more explosive charges to slow the helicopter just prior to impact to mitigate a crash, and to program the control system to automatically take control of the aircraft in an emergency to provide for a relatively soft upright landing. The helicopter can be configured for carrying one or two persons, in the latter case for providing an ultralight trainer.

Other features and advantages of the present invention will be apparent to those skilled in the art with reference to the following detailed description, taken in combination with the accompanying drawings, which illustrate, by way of example, such features and advantages.

BRIEF DESCRIPTION OF THE DRAWINGS

FIG. 8b is a perspective schematic illustration of the control system shown in FIG. 8a;

Like reference numbers refer to like elements throughout the drawings showing the various exemplary embodiments.

DETAILED DESCRIPTION

Figure 1:
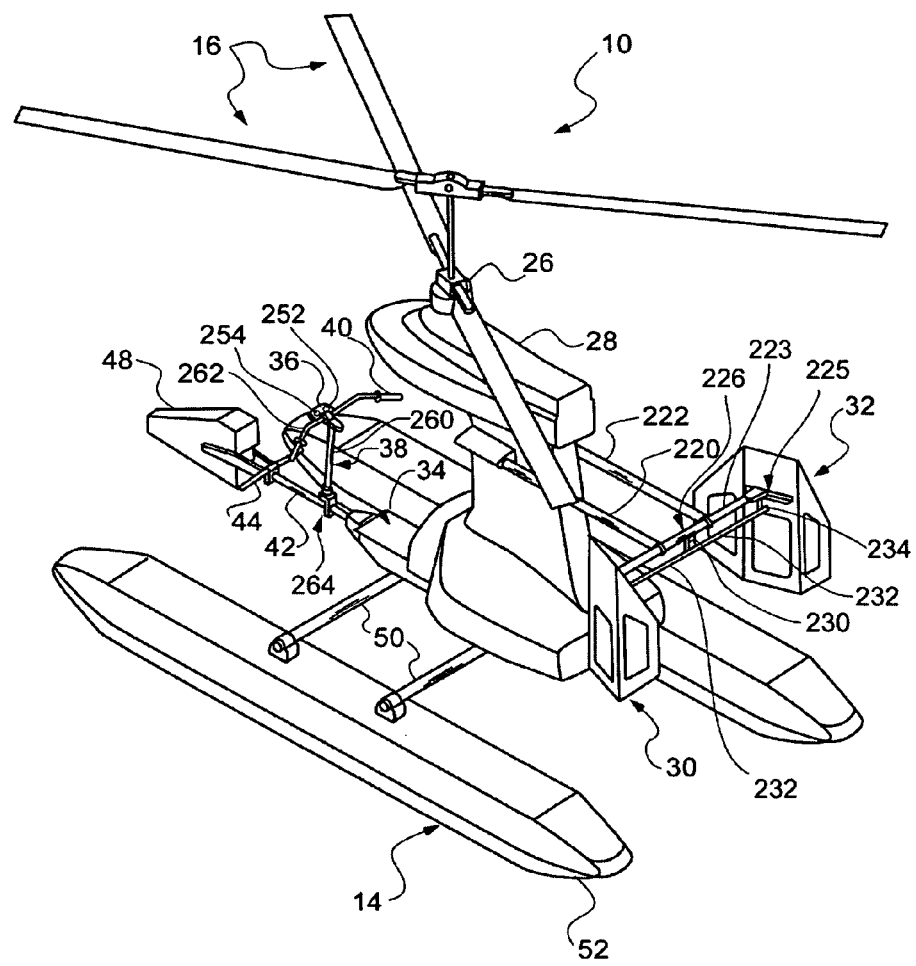
FIG. 1 is a left rear perspective pictorial view of an exemplary ultralight coaxial helicopter in accordance with the invention, some structure being deleted for clarity.
Figure 2:
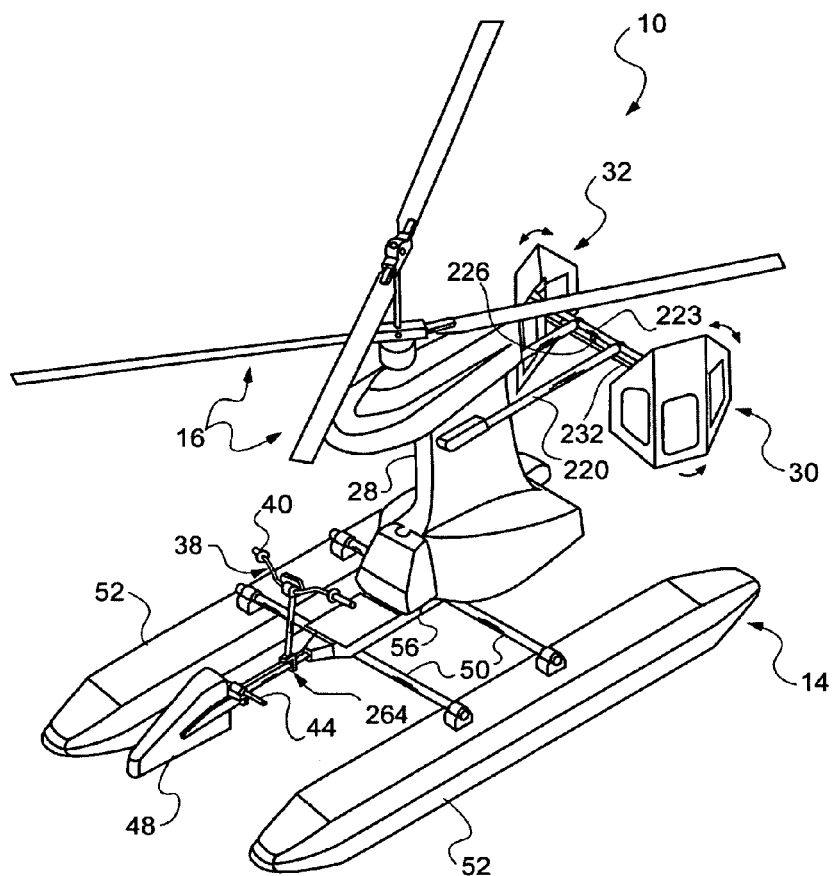
FIG. 2 is a left front perspective pictorial view of the helicopter of FIG. 1.
Figure 3:
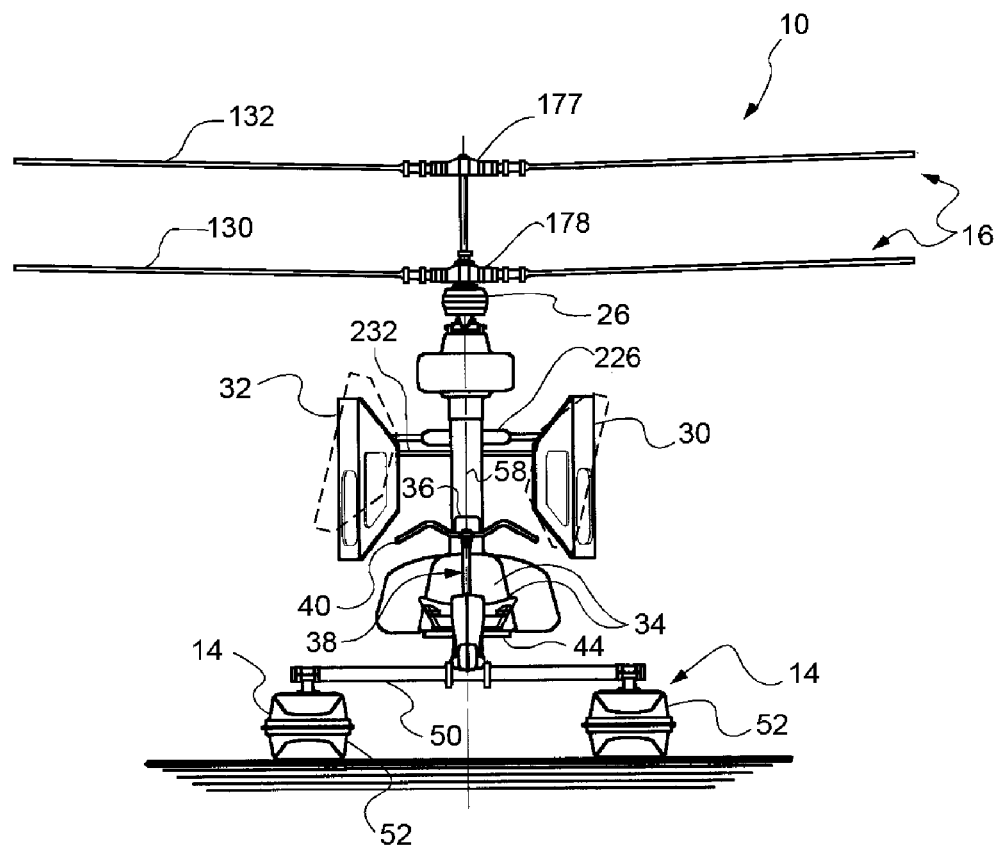
FIG. 3 is a front elevation view of the helicopter of FIG. 1, some structure not being shown for sake of clarity.
Figure 4:
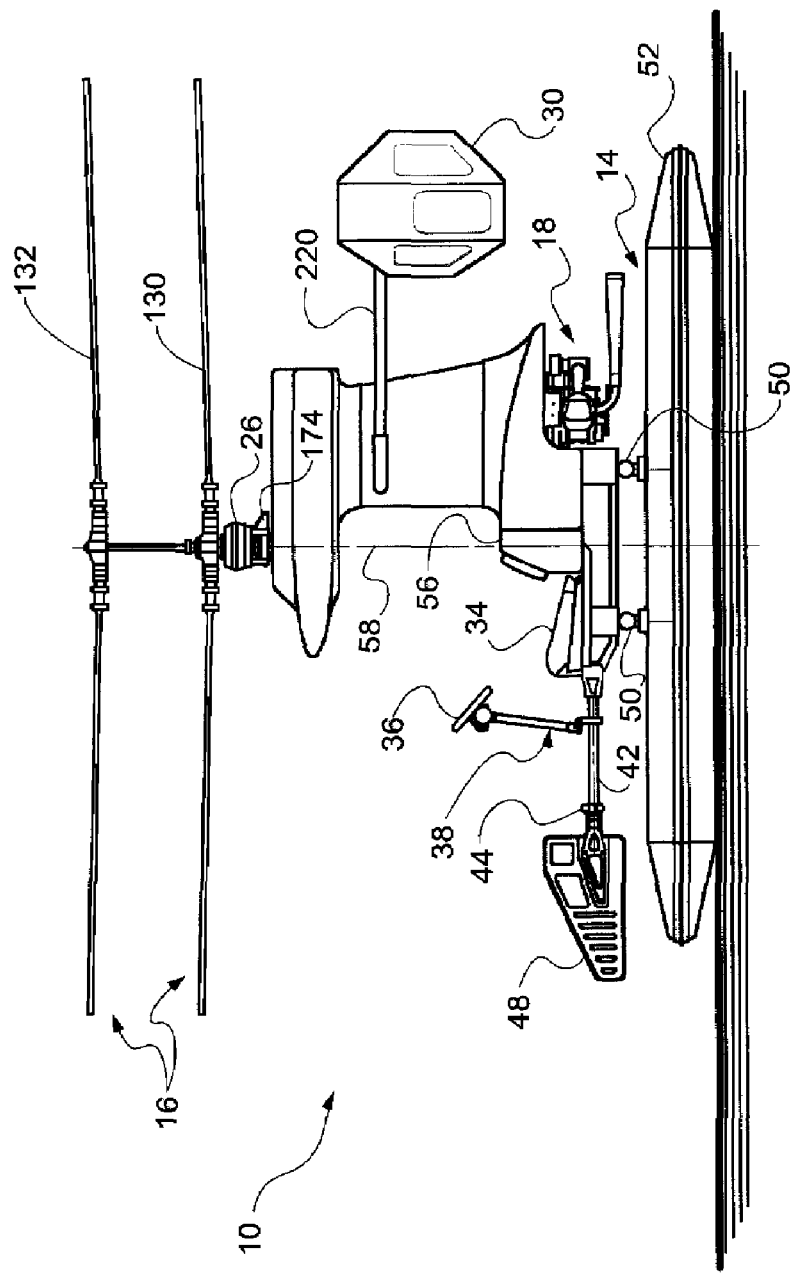
FIG. 4 is a left side elevation view of the helicopter of FIG. 3.
Figure 5:
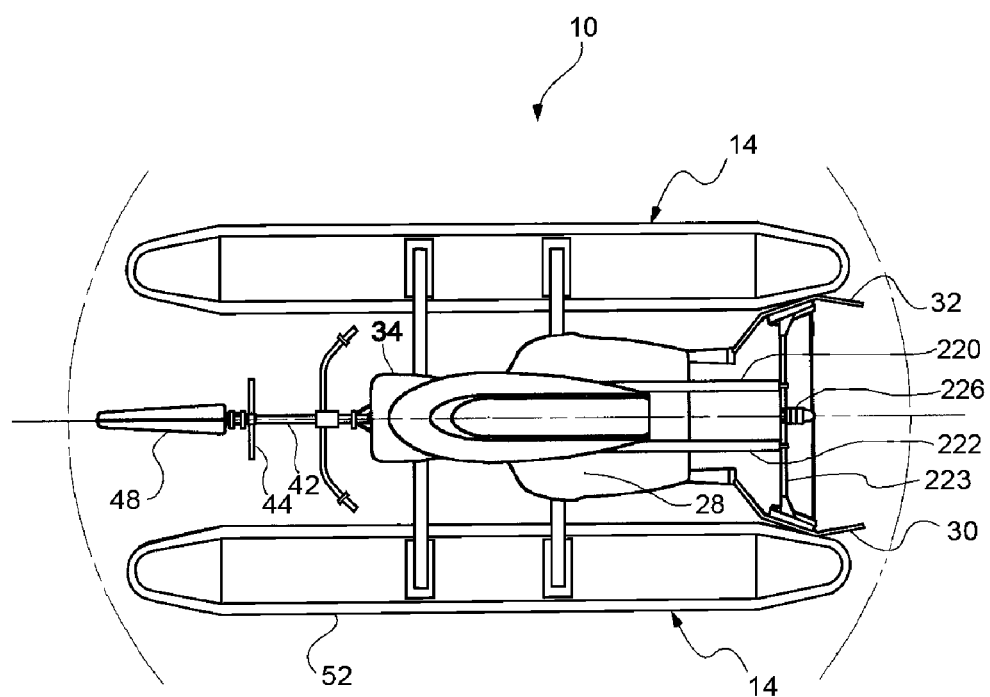
FIG. 5 is a top view of the helicopter of FIG. 4.

Reference will now be made to the drawings in connection with the following detailed description, in which the various elements of the illustrated example(s) of embodiments of the invention will be described and discussed. It is to be understood that the following description is only exemplary of the principles of the present invention, and should not be viewed as limiting of the scope of the invention.

With reference to FIGS. 1 through 6 of the drawings, the invention is embodied in an ultralight helicopter 10 having a generally L shaped airframe 12 supported by pontoon landing skids 14 while on the ground, and a coaxial rotor set 16 when airborne. A gasoline engine 18 powers the coaxial rotors through a centrifugal and sprag clutch unit 20, drive shaft 22, belt drive transmission 24, and rotor coaxial drive transmission gear box 26. The engine, clutch, drive shaft, and belt drive transmission can be enclosed, either partly or entirely, within a sleek aerodynamic cowling or body 28 which improves the aerodynamics of the helicopter, and also improves its aesthetic appearance. Other shapes and appearances can be used in the cowling. Located rearwardly of the cowling, and below and in the downwash of the coaxial rotors are a pair of yaw paddles 30 and 32 which allow yaw control of the helicopter by redirecting rotor downwash to one side or the other, as described in more detail below. The yaw paddles also provide a slight drag force during forward flight, which enhances directability and controllability of the rotorcraft.

An operator seat 34 and flight controls (including control panel 36, control stick 38, and twist-grip throttle lever 40) are carried by and/or located on a forward boom 42 extending forwardly from the frame 12, below the coaxial rotor set 16, along with a pair of footrests 44 for the operator. A seatbelt system 46, preferably a four or five-point belt system, is provided for the operator's safety and security. The engine 18 and drive shaft 22 are disposed on the rear of the frame behind the operator seat, and a ballast tank 48 is provided on the extreme forward end of the boom 42, for allowing water or other fluid to be added or removed to balance the craft, depending on the weight of the operator. The landing gear 14 are attached to the frame by cross members 50. The landing skids depicted in the FIGs. can comprise air-inflated pontoons 52, preferably formed of lightweight, durable polymer material. However, it will be apparent that other landing gear types may be provided instead of pontoons, such as wheels, skids, or other devices.

Moreover, in describing the airframe as "L-shaped" it will be appreciated that this can apply in a number of ways. In one embodiment (as shown in the figures) a unitary composite material structure looking roughly like the letter "L" when viewed from the starboard side can be considered the L-shaped frame. In another embodiment the "L" shape can comprise a vertical frame member and a horizontally disposed attached bracket portion at the top supporting the transmission 26, thus together the two attached pieces forming an upside-down L-shape viewed from the starboard side. In another embodiment the L-shape can comprise a vertical member and a horizontal boom extending forwardly adjacent a bottom portion, comprising two pieces attached together to act integrally as an L-shaped frame (again when viewed from the starboard side). In that embodiment the boom would support the seat 34, as well as the control handlebar 38 and ballast tank 48 as the shorter boom 42 does in the illustrated embodiment.

In another embodiment, the frame 12 can be generally "C" shaped, in that it can have portions that extend forwardly at the top and bottom, and a portion or portions that extend vertically, incliningly, or curvingly up or down between the upper and lower forward extending portions. Generally speaking the prime mover 18, being heavy, is disposed low and to the rear of the frame, to balance the weight of the pilot and move the center of gravity lower and closer to the center to be more closely aligned with the thrust vector of the rotor set corresponding with the rotor axis centerline 58.

A fuel tank 56 is attached to and carried by the frame 12 behind the operator seat 34, directly below the centerline 58 of the rotors 16. This placement provides the advantage that as fuel is used and the weight of fuel in the tank changes, the balance of the craft will not be noticeably affected because the weight of the tank is directly below the centerline of the rotor and aligned with upward force vector provided by the rotors. While the helicopter 10 depicted in FIGS. 1–6 is configured for a single operator/passenger, an ultralight helicopter embodying the features of the present invention may also be configured to accommodate 2 passengers, for example as an ultralight trainer. While including all of the same general features of the single seat embodiment, the two seat embodiment (not shown) includes a second operator/passenger seat and a slight rearrangement of mechanical elements to account for differences in weight and balance.

Figure 6:
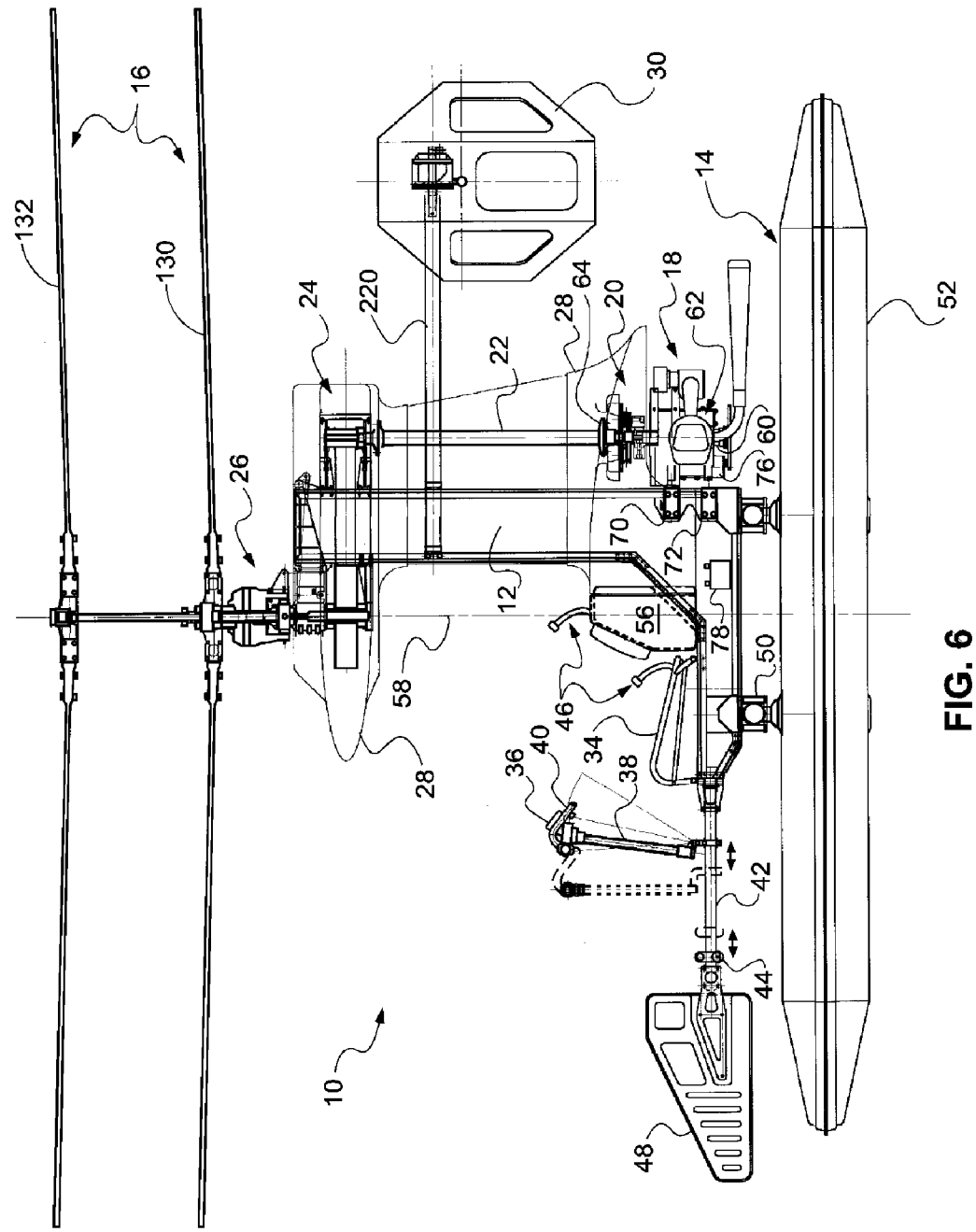
FIG. 6 is left side elevational view, partially in phantom to revel underlying structure, and some structure shown being shown partially in cross-section, and some structure not being shown so as to illustrate the principal elements of the helicopter and their relationship to the L-frame of the helicopter of FIG. 1.
Figure 7:
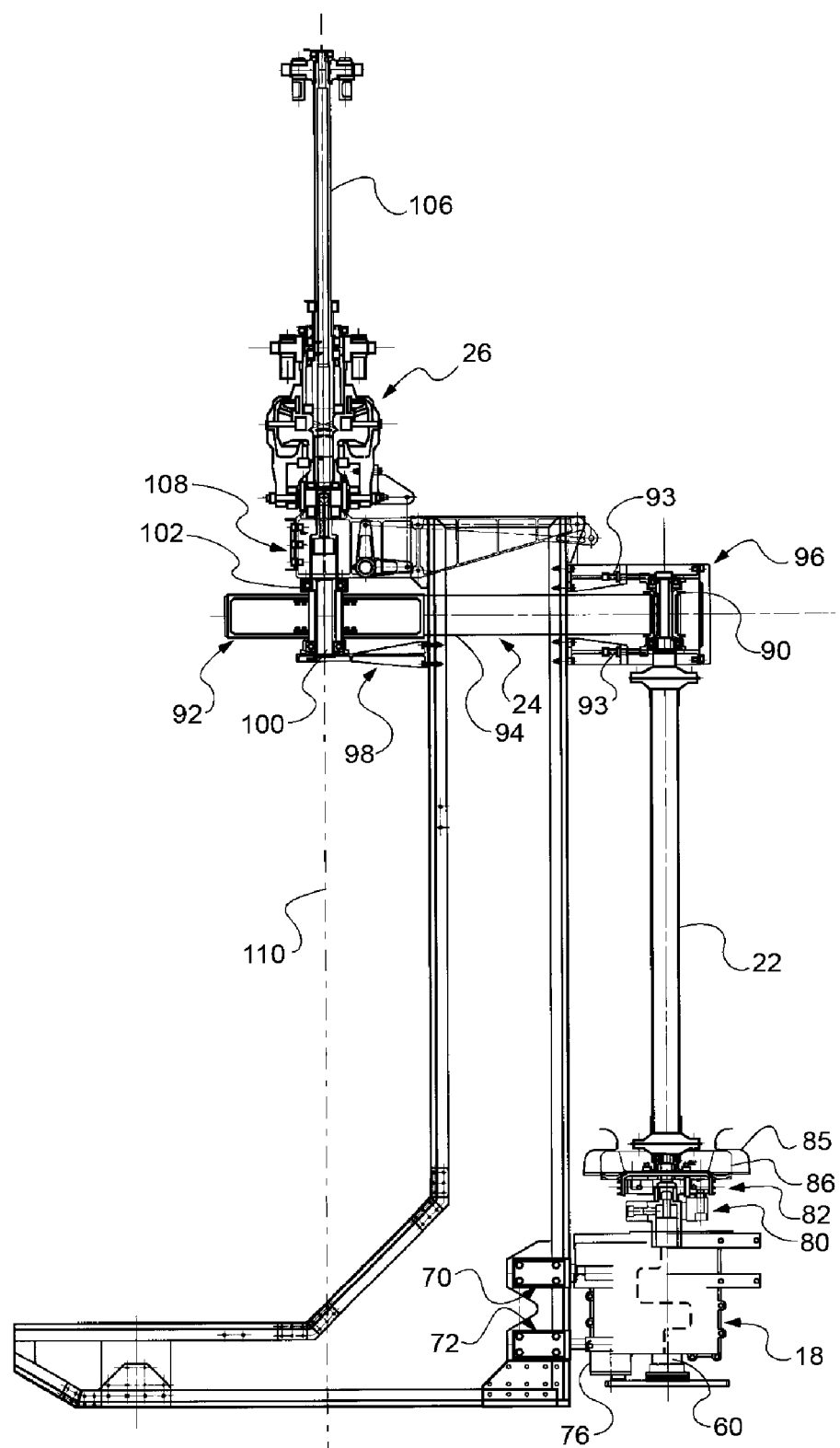
FIG. 7 is a left side elevation view illustrating the L-frame and the rotor drive system components attached thereto of FIG. 6, certain elements being shown in a simplified or outline manner, and some elements being omitted altogether, for clarity of the figure.

Viewing particularly FIGS. 6 and 7, the engine 18 in the illustrated embodiment is a vertically oriented piston engine, with a generally vertical crank shaft 60, which transmits power to the belt drive transmission 24 disposed at the top of the frame 12, above the pilot seat 34. The engine is preferably a two-cylinder, four-stroke, air-cooled aluminum engine similar to engines used in other ultralights, motorcycles, ATV's, and other small vehicles, though modified for its rotated (vertical) orientation. A suitable engine for the single passenger helicopter embodiment of FIG. 1 is manufactured by Pearson Motors (NZ) Ltd. of Bromley, Christchurch, New Zealand. Other engines may also be used, including other internal combustion engines, high power electric motors, turbine engines, rotary engines, etc. As will be appreciated another engine with suitable size, weight, and performance characteristics may be employed, whether now known or later developed. It will also be apparent that a more powerful engine may be required for a two-person embodiment.

As used in the present invention, the engine is rotated 90 degrees from what would be considered a normal engine operating orientation, such that the crank shaft 60 is vertical, and the cylinders 62 are substantially horizontal. This requires that the lubricating oil circulation system be modified for the rotated orientation. Internal combustion engine lubrication systems normally rely on gravity to return oil to an oil pan or sump, from which it is pumped for recirculation through the engine. This is a wet sump configuration. The engine of the present helicopter is modified such that it uses a dry sump, so that lubricating oil may be properly distributed throughout the engine.

In another embodiment the engine 18 may be inclined, rather than mounted vertically. For example, the belt drive arrangement may be replaced with an inclined drive shaft, directly connecting the transmission 26 to the engine via a CV joint at the tipping axes of the rotor set 16. In that embodiment the reduction provided by the pulley drive of the illustrated embodiment can be provided by a reduction gear arrangement in the transmission, or eliminated by appropriately configuring the rotor set and engine so that the rotors operate in the power band provided by the engine without such a gear reduction. In embodiments without the belt drive, one or more dampers (as discussed below) is incorporated in the drive shaft 22 to mitigate rotational velocity anomalies and shock and vibration from the engine. The belt drive in the illustrated embodiment has some "give" which provides this damping and shock absorbing function, allowing the drive shaft to be configured without dampers in one embodiment.

The engine 18 is mounted to the rear of the L frame 12 by mounts 70, 72. These mounts are preferably formed integrally with the L frame and include elastomeric elements; and they securely hold the engine to the frame, while damping vibrations.

Other components associated with the engine include a starter motor 76, battery 78, and an alternator or magneto. The starter motor can function as the alternator in one embodiment, with appropriate electronics and switching. These arrangements are conventional and such components are relatively lightweight and are selected to be compatible with the engine 18 used. Accordingly, the user may start the engine by activating controls on the control panel 36, which cause the starter motor to engage and start the engine or to revert from an alternator (or magneto) to a motor to turn the engine during starting.

Furthermore, it is recognized that helicopter rotor systems generally require a significant startup time while power is applied to overcome their inertia and drag resistance in order to reach operating speed. With reference to FIGS. 6, 7, and 9A–E, it will be appreciated that to allow unencumbered start-up of the engine 18 and gradual engagement of the engine with the rotor set 16, the crank shaft 60 of the engine can be connected to the drive shaft 22 by a vibrational damper 80 and a centrifugal clutch 82. The centrifugal clutch engages when the engine revs to sufficiently high rotational speed, and therefore the engine can be started and idled independently of and not engaged with the rotor set 16, which will begin rotating as the clutch engages as the engine speed is increased. When the engine speed is reduced, the damper, if used, reduces stress on the helicopter 10 rotor set and the engine 18 and its bearings by allowing for vibration and slight translation of the crank shaft 60, and the damper and clutch arrangement also allows for smoother transition in sudden variations in rotor speed due to drag, etc. from changes in environmental or control conditions.

An overrunning clutch, or sprag 84 is also provided, so that the rotor set 16 can continue to rotate if the engine 18 ceases to rotate, or dramatically reduces speed so as to otherwise put undue stress on the drive system. Provisions for air cooling of the clutch unit 20 are made, including a shroud 85 and fan 86.

Figure 8:
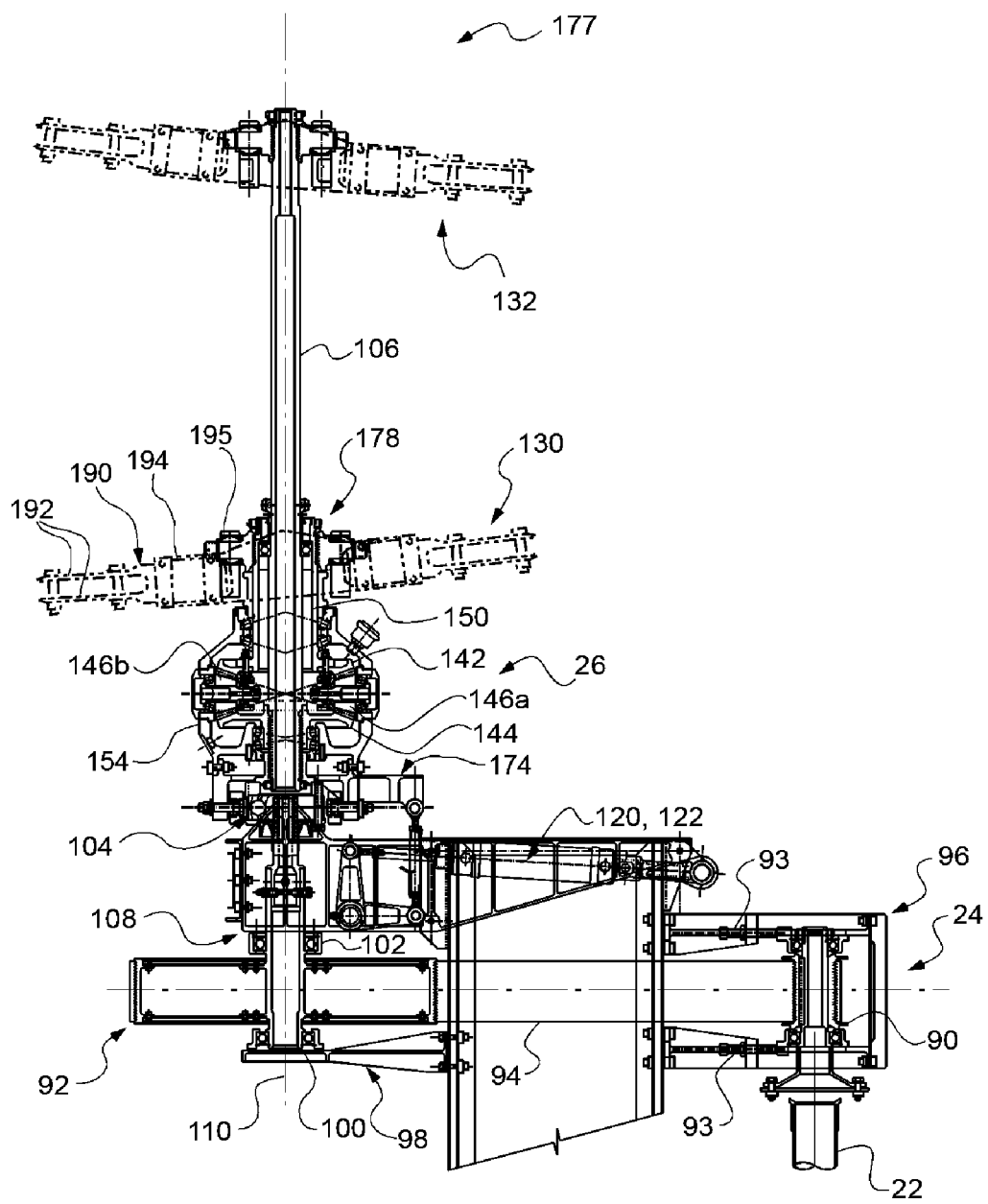
FIG. 8 is more detailed close-up, partially cross-sectional view, of the belt drive, transmission and certain rotor drive portions of the L-frame and rotor drive system illustrated in FIG. 7.

Viewing FIGS. 6, 7, and 8, there is shown a cross-sectional view of the belt drive transmission 24. The engine drive shaft 22 extends generally vertically from the engine 18 to a drive pulley 90 associated with the belt drive transmission. The drive pulley transmits the rotation of the drive shaft to a transmission pulley 92 through belt 94. As mentioned, in addition to coupling the engine to the rotor drive transmission gearbox 26, the belt drive transmission may also be configured for adjusting the rotational speed to suit the rotor set 16 by variation of the relative sizes of the pulleys 90, 92. It will be apparent that the belt can be appropriately tensioned by tensioning bolts 93.

The drive pulley 90 and transmission pulley 92 are fixed to the frame through a drive pulley bracket 96, located rearwardly, and a transmission pulley bracket 98, located forwardly. The bearings for the pulleys are attached to these brackets. A transmission drive shaft 100 extends upward from the transmission pulley 92 through the transmission drive shaft bearing 102 to a constant velocity (CV) joint 104, which connects shaft 100 to a rotor drive shaft 106. A gimbal arrangement is provided here coaxially with the CV joint to tiltably connect the rotor drive transmission gearbox to a transmission mounting bracket 108 fixedly connected to the top of the composite portion of the frame 12, and the transmission drive shaft bearing 102 is disposed therein. The transmission mounting bracket 108 extends forwardly generally parallel with the roll axis of the airframe, and such that the transmission pulley 92 and transmission drive shaft bearing 102 are disposed above the operator seat 34. The drive pulley 90 and drive pulley bracket 96 are located behind the frame, directly above the engine 18.

It will be appreciated that during flight the entire lifting force of the rotor set 16 of the helicopter 10 will be transmitted through the transmission mounting bracket 108, which must therefore be very strong. The bracket is formed of cast or machined pieces bolted together, and the bracket and composite frame portion are bolted together. In the illustrated embodiment the bracket is formed of an alloy of aluminum or steel, and is machined to accommodate secure connections to the frame, and attached bearings, pulleys, fittings, etc.

Figure 10:
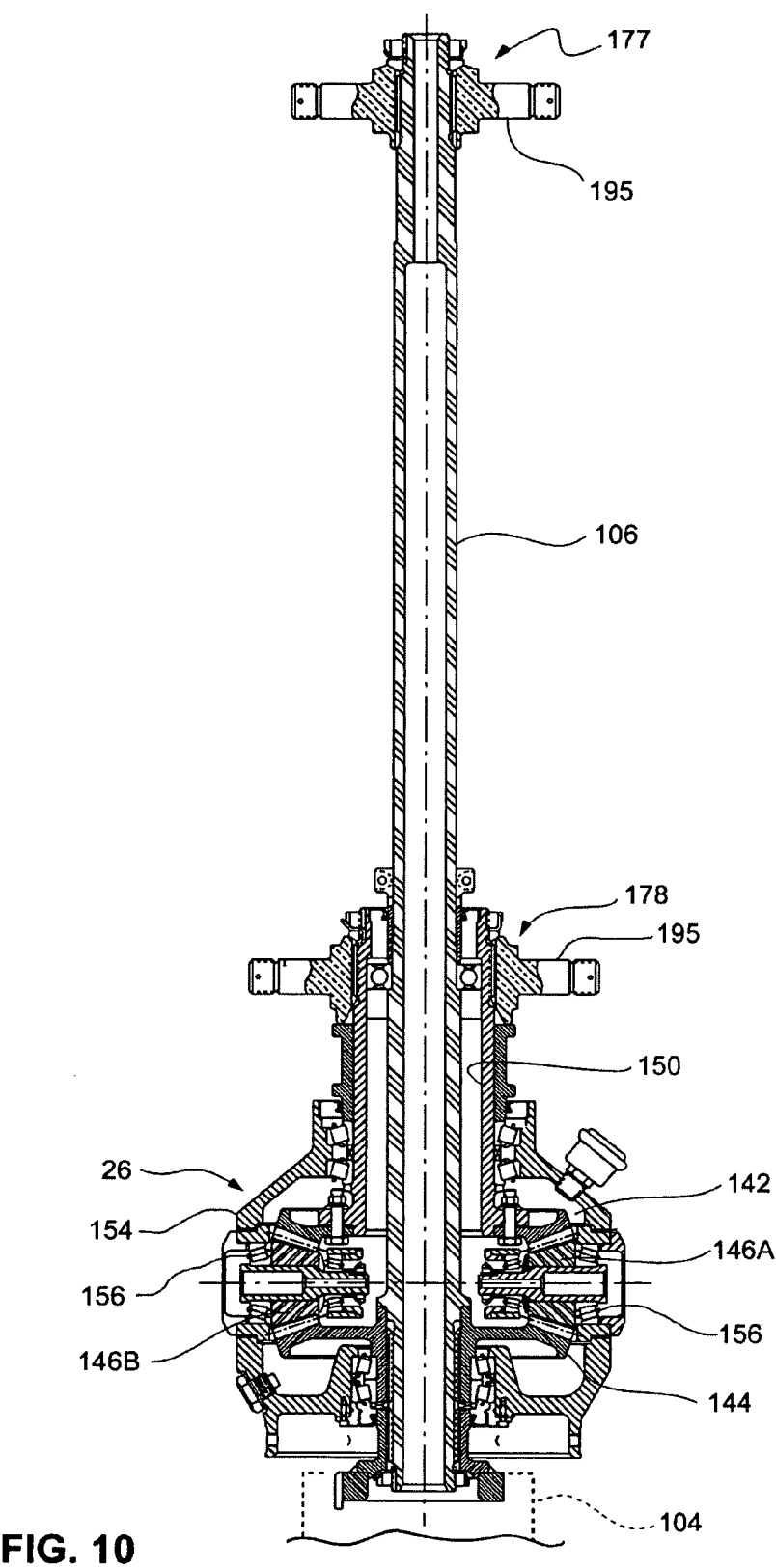
FIG. 10 is a more detailed cross-sectional view of a transmission and rotor drive system.

The gimbal arrangement mentioned, and the CV joint 104 allows the rotor drive shaft 106 to tilt forward and back, and side to side, within a conical range, allowing pitch and roll control of the helicopter through tilting the rotor axis 110 as discussed. Rotor pitch and roll control actuators 120 and 122 control the tilting of the rotor axis in orthogonal directions, and are described in more detail below. Disposed above the joint 104 is the rotor transmission gear box 26 for converting the unidirectional rotation of the rotor drive shaft into counter-rotational driving force for the lower and upper rotors 130 and 132, respectively. With reference to FIG. 10 as well as FIGS. 6, 7 and 8, the rotor transmission or gear box 26 includes a first bevel ring gear 142 and a second bevel ring gear 144, and plurality of pinion gears (146a and 146b are shown, but 4 pinion gears can be used).

The power in the first rotor drive shaft 106 divides into a second or outer drive shaft 150, and an inner and outer drive shafts are concentric with each other. The first, or lower rotor 130 is actuated by the outer drive shaft through the upper bevel gear 142. The second, or upper rotor 132 is driven by the first, or inner, drive shaft through the second, or lower, bevel gear 144. Power is transmitted between the first and second bevel gears by the pinion gears 146, which rotate within, and are rotatably connected to, the rotor gear box housing 154 via bearings 156. It will be apparent that the counter-rotational gear drive could be configured in other ways, such as a planetary gear arrangement (not shown), or other gear arrangement configured for causing one rotor to rotate counter to the other. The gear drive could also be configured to include a reducing gear set to change the rotational speed of the rotors relative to the rotor drive shaft 100. This would provide reduction above that already provided by the pulley and belt drive elements described above.

Figure 8A:
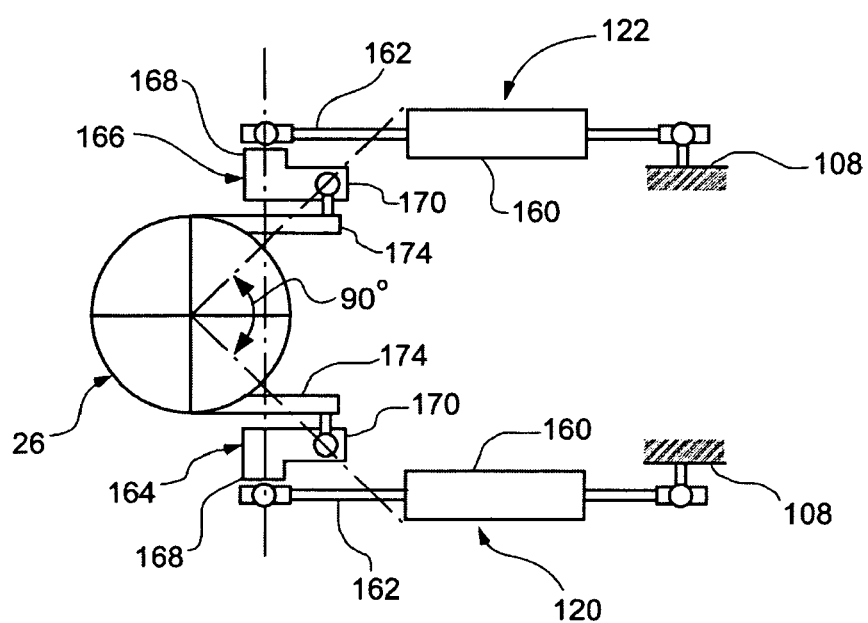
FIG. 8a is a top view of the rotor control actuator system.
Figure 8B:
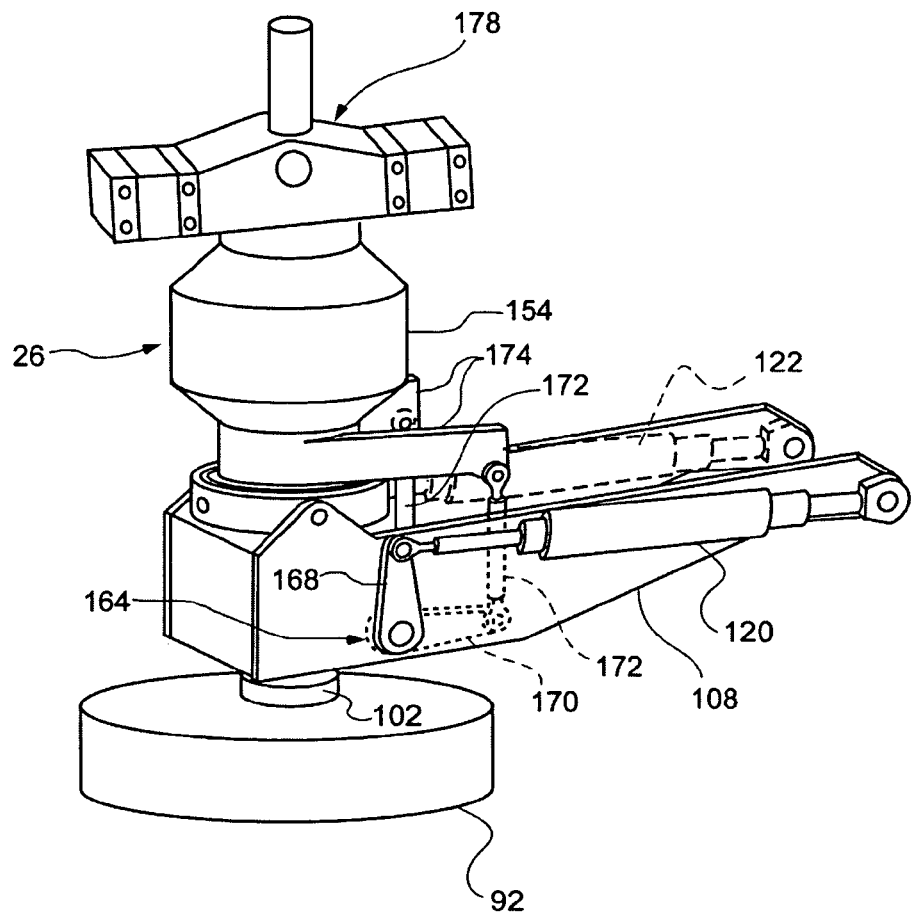
Figure 9:
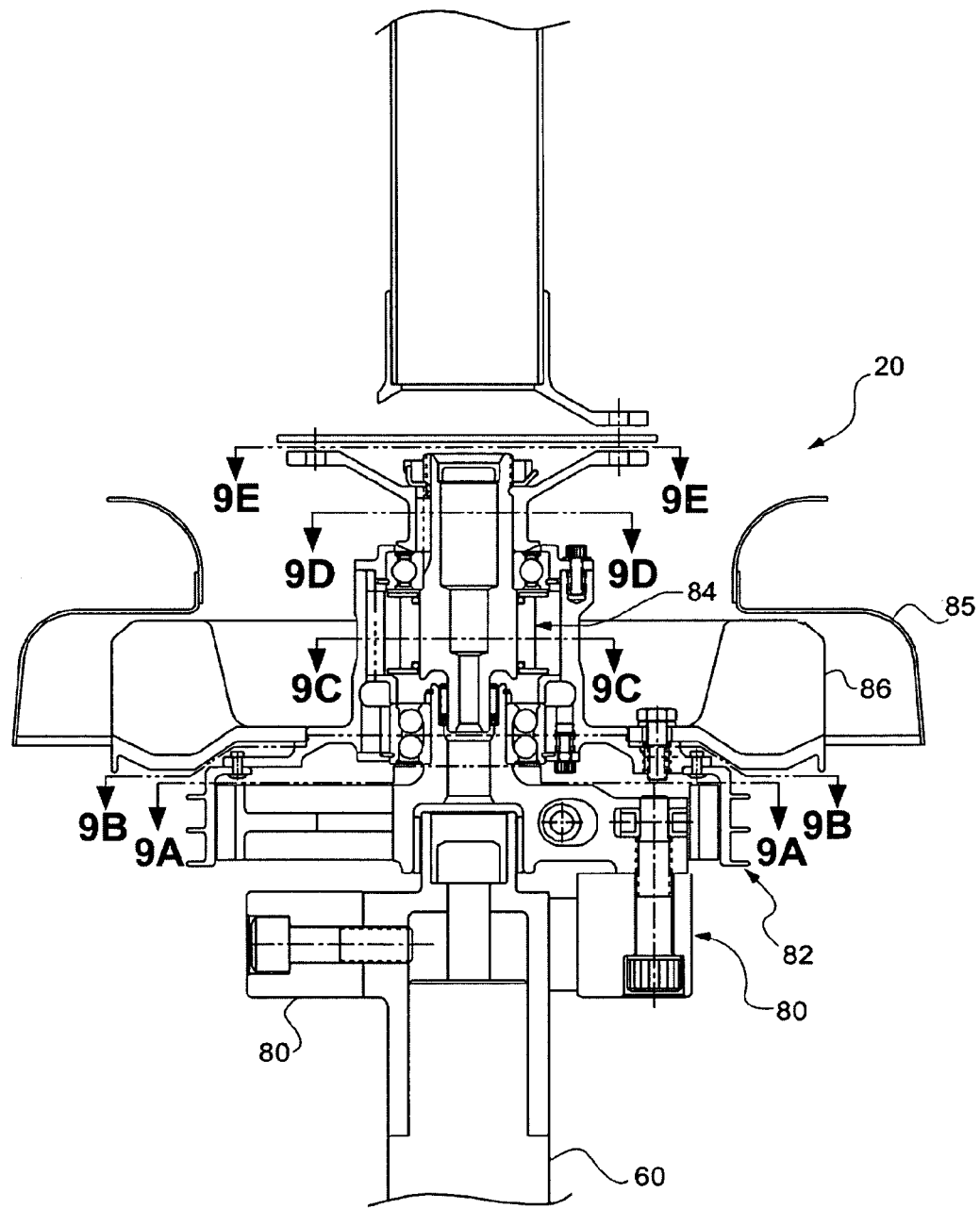
FIG. 9 is a cross-sectional view of the centrifugal clutch and sprag unit associated with the engine and drive shaft.
Figure 9A:
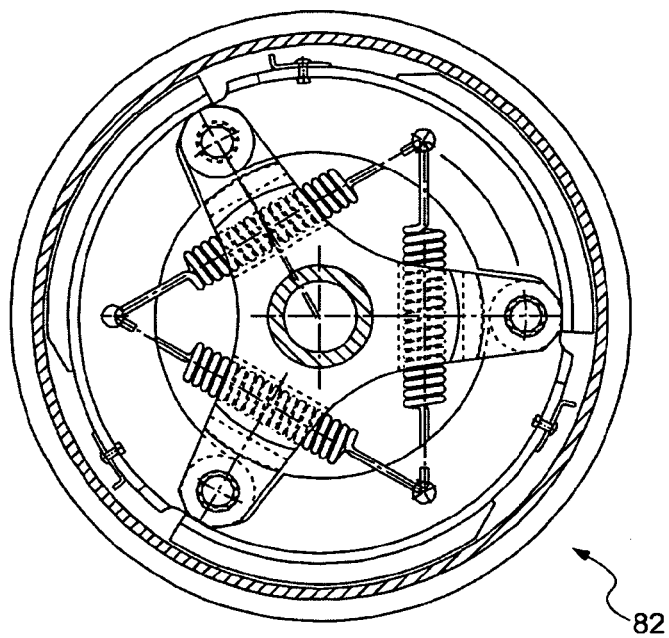
FIG. 9A is a cross-sectional view taken along line A—A in FIG. 9 of the centrifugal clutch and sprag unit shown in FIG. 9.
Figure 9B:
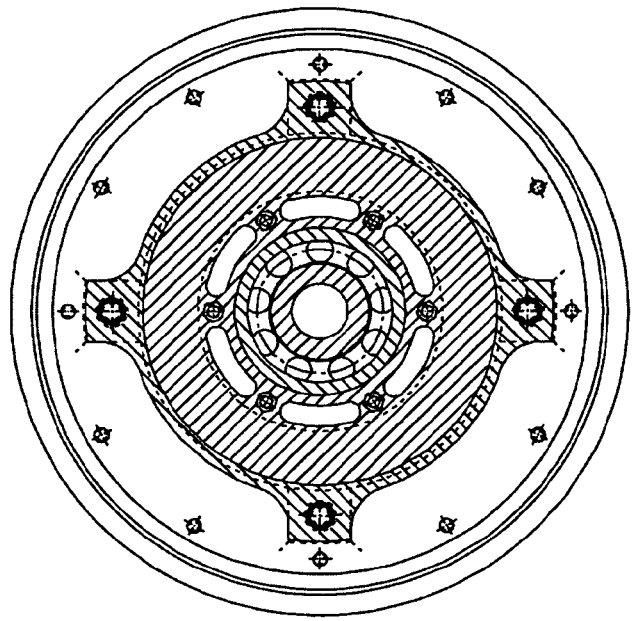
FIG. 9B is a cross-sectional view taken along line B—B in FIG. 9 of the centrifugal clutch of the centrifugal clutch and sprag unit shown in FIG. 9.
Figure 9C:
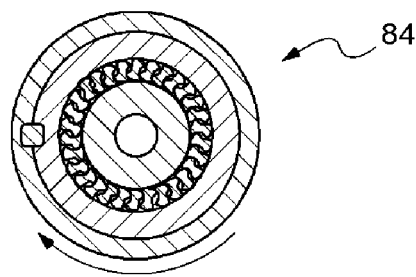
FIG. 9C is a cross-sectional view taken along line C—C in FIG. 9 of a sprag portion of the centrifugal clutch and sprag unit shown in FIG. 9.
Figure 9D:
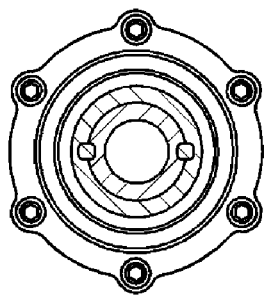
FIG. 9D is a cross-sectional view taken along line D—D in FIG. 9 of the centrifugal clutch and sprag unit shown in FIG. 9.
Figure 9E:
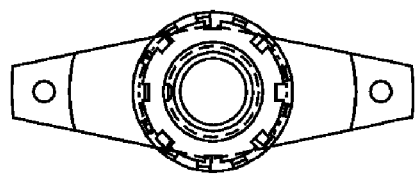
FIG. 9E is a cross-sectional view taken along line E—E in FIG. 9 of a portion of a damping coupler above the centrifugal clutch and sprag unit shown in FIG. 9.

Viewing FIGS. 8, 8a, and 8b there is shown a rotor control actuator system. As noted above, the rotor control actuators 120 and 122 tilt the counter-rotational gear drive 26 and rotor set 16 with respect to the airframe 12 in response to control inputs provided by the operator or the operator and the electronic control system together, to provide pitch and roll control for the helicopter 10. The rotor control actuators 120 and 122 are preferably hydraulic actuators, but can be electrical servos which comprise an actuator body 160 and a linearly extendable or retractable actuator rod 162. The actuator bodies 160 are hingedly connected to the transmission bracket 108 at a top of the frame 12, and the actuator rods are pivotally connected to first arms 168 of bell cranks 164 and 166, which are pivotally connected to the to the transmission mounting bracket 108. A second arm 170 of each bell crank is pivotally connected to the gear box housing 154 through a push rod 172. In another embodiment the actuators can be replaced by a cable system for direct control by the pilot operator, as discussed below.

As shown, the push rods 172 are attached to lever arms 174 of the gear box housing 154. The vertical location of the lever arms aligns them with the pivot point of the universal joint 104, and the ball joints at the rear ends thereof are on axes oriented 90 degrees apart with respect to the rotor axis 110, so as to allow proper operation. When the actuators tilt the rotors, this shifts the center of gravity of the airframe (and everything supported thereby) relative to the rotor set. In this way, the center of gravity of the airframe, and therefore of the helicopter as a whole, is shifted with respect to the upward thrust vector generated by the rotor set. The helicopter will change attitude, depending on the direction of tilt of the rotors. Pitch and roll control is thus effected by weight shifting, as opposed to conventional control by cyclic alteration of the pitch of the rotor blades.

As mentioned, the lever arms 174 are horizontally positioned at locations which are rotated 90° from each other, but are not aligned with the longitudinal or transverse axes of the helicopter frame. Rather, the lever arms are preferably rotated 45° from the longitudinal and transverse axes of the helicopter. Because of this configuration, both actuators operate in tandem to properly adjust the rotor axis for pitch and roll control. For example, to move the helicopter forward, both actuators must extend equally, causing the bell cranks to tilt the gear box housing 154 and rotor set forward, along the longitudinal axis of the helicopter. This tilts the rotor set forward, creating a forward component of force which causes the craft to move forward. To cause the craft to roll left or right, the rotor set can be tilted to the left or right, respectively. To do this, the actuators must move differentially, such as one actuator extending and the other retracting, or one extending to a lesser degree than the other. The cooperative operation of the actuators is caused by the controller based on operator input to the control stick. Using this control system, the rotor set can be caused to tilt forward, backward, side to side, or any combination thereof in a conical range. In another embodiment control is effected by coupling hydraulic actuators to the control handlebar and fluid lines to corresponding actuators 120, 122 coupled to the bell cranks, such that tilting movement of the handlebar control produces corresponding tilting motion of the rotor set.

It will be apparent that the spinning rotors will create a gyroscopic effect which will tend to resist being tilted. Because of this tendency, when the actuators push upon the housing 154, the initial reaction of the craft may be a combination of tilt of the rotors and tipping of the airframe, at least in absolute terms, with respect to the ground, for instance. Then, as gravity pulls the center of mass of the airframe back to a point vertically below the center of lift, the airframe will regain its intended horizontal alignment, and in so doing pull the rotors to the desired tipped orientation. For example, when the actuators move to tip the rotors to the right, the right side of the airframe will tend to tip upward, as the right side of the rotors tips downward, until the airframe corrects itself and the weight of the airframe pulls the right side of the rotors down to the intended position.

As can be appreciated, because they operate in tandem, the actuators 120, 122 need not be disposed to act at exactly 45° offset from the centerline of the helicopter, nor do they need to be offset 90° from each other. In theory, the actuators could be placed at any offset relative to the helicopter centerline, so long as their control linkage lengths are suitable to allow adequate deflection in each desired direction. As a practical matter, the inventors have found that the actuators can be configured for operation at an offset of anywhere from 25° to 65° relative to the centerline, though 45° is preferred. So long as the computer controller is programmed to cause proper differential motion of the actuators (or the actuators are appropriately directly hydraulically connected to the controls), the rotor axis can be properly controlled so that pitch and roll response is immediate and precise.

As mentioned, in one embodiment the hydraulic system alone is used for control, and hydraulic actuators coupled to the controls actuated by the pilot are directly fluidly coupled to the actuators 120, 122 moving the rotor set 16 tiltably, as well as the yaw paddles. For example, actuators attached near the base of the handlebar stick/yoke control 38 can be directly linked by fluid lines to hydraulic actuators at the yaw paddles and at the base of the gimbaled transmission 26 so that movement of the handlebar cases immediate and corresponding movement of the control surfaces 30, 32 and rotors. Moreover, in another embodiment, the hydraulic system can be replaced by conventional cables and pulleys, as is known, and some weight savings is possible by using direct cable mechanical actuation rather than a hydraulic system. The handlebar stick control yoke actuated by the pilot can be attached near its base to the cables (not shown), as can be done with the hydraulic actuators (not shown), and this provides a lever action magnifying the force inputs of the pilot many times over in control movements such as tilting the yaw paddles and tilting the rotor set with respect to the airframe.

The rotor blades for use with the helicopter 10 of the present invention are preferably fiber composite blades which are fixedly connected to the blade hubs 177, 178 of the upper and lower rotors 130, 132. Unlike conventional helicopters, by virtue of its tiltable rotor axis, the coaxial helicopter of the present invention does not require collective or cyclic pitch control of the rotor blades to control pitch and roll. This simplified control system allows the rotor blades and hubs to be simpler and more rugged in design, while also being lightweight. At the same time, the rotor blades are fixed in their orientation relative to the rotor axis, and do not have a neutral lift position. Consequently, the lift of the helicopter is controlled by the rotational speed of the rotors. As mentioned, allowance for adjustment of the fixed pitch of the blades can be provided in one embodiment. However, generally an optimal compromise position for performance over a range of conditions with an engine and transmission set-up will be "factory set" and need not thereafter be adjusted. Again, this allows a more simple, strong, and lightweight construction.

The first, or lower, set of rotor blades 130 are attached to the outer drive shaft 150 by blade cuffs 190, comprising clevis pieces 192 attached to a rotor hub 194 connected to the outer drive shaft through a teetering hinge pin (195, rotated 90° from hub in FIGs.) disposed substantially orthogonally to the longitudinal axes of the lower rotor blades. The teetering hinge is located slightly above the rotor hub, and accordingly the lower rotor set is under-slung. The rotor can be coned upward at about 1.5 degrees.

The outer drive shaft 150 is supported by outer bearings 196 and a sleeve 198. A set of inner bearings 200 are disposed between the outer drive shaft and the inner drive shaft 152. Another bearing 202 is disposed between the inner drive shaft and the case at the lower end of the inner drive shaft. These bearings support the various elements and allow rotation and counter rotation of the elements as described herein.

The second or upper rotor 132 will now be described in more detail. The rotor blades are also inclined slightly upward, forming a coned rotor, as is done in lower rotor 130. The angle of coning is about 1.5 degrees upward also. It will be appreciated than in other embodiments the lower rotor can be coned less or can be horizontal, and other amounts of coning for the rotors can be used, depending on other parameters of the hub and rotor in each case.

It should be noted that the upper rotor 132 blades are pitched less than the lower rotor 130 blades to account for the fact that there is, in effect, an inflow from the upper rotor to the lower rotor and accordingly for the two rotors to be "balanced", so as not to induce rotation of the airframe 12, the lower rotor must have more "bite." This can be about ½ degree less in one embodiment. The rotors are underslung, and are limited in teetering so as not to interfere. Elastomeric bumpers (not shown) can be used in the hubs 177, 178 to provide softer teetering stops. The pitch of both rotors is fixed in the illustrated embodiment, but as discussed can be configured to be adjustable on the ground to allow for balancing the torque characteristics.

With reference to FIGS. 1–6, yaw control in the illustrated embodiment is facilitated by yaw paddles 30 and 32, which are disposed rearwardly on the airframe 12, below the counter-rotating coaxial rotor set 16. The yaw paddles 30 and 32 are connected to the airframe by a pair of yaw paddle booms 220 and 222, which extend rearwardly from the airframe 12. The yaw paddles are configured to pivot on a transverse boom 223 supported by the yaw paddle booms, such that the yaw paddles may rotate with respect to downwardly flowing air from the rotor set (the rotor downwash), and thereby deflect air laterally to produce a sideways thrust vector which is offset from the center of mass of the helicopter 10 (and from the axis 110 of the rotor thrust vector), for rotating or yawing the airframe right or left about the rotor axis.

Rotation of the yaw paddles is controlled by a yaw paddle control actuator mechanism 224 located at the base of the handlebar control 38 and sensing rotation of the handlebars, which activates a yaw paddle hydraulic servo 226 attached to a transverse yaw paddle beam 223. The servo 226 has a crank 230 which is connected by a yaw linkage 232, to a yaw control arm 234 located on the interior side of each yaw paddle. By virtue of this configuration, when the servo is actuated to deflect right or left, both yaw paddles simultaneously angle right or left, deflecting the rotor downwash accordingly. The yaw paddle control further comprises adjustability in the yaw control arm 232. Combined with adjustability in the crank 230, yaw control can be made more sensitive or less sensitive, and a "neutral" position can be adjusted to counteract any slight imbalance in the counter rotating coaxial rotor set, which could tend to yaw the airframe right or left. As will be appreciated, direct hydraulic or cable mechanical control of the yaw paddles by rotation of the handlebars is also contemplated in other embodiments. This can be facilitated by providing a rotational joint near the base of the handlebar as contemplated by the discussion above, and a sensor, hydraulic actuator, or cable arrangement that picks up and transmits rotational movement control inputs from rotation of the handlebar control independent of tilting of the handlebar control.

As depicted in the drawings, the yaw paddles have a curved airfoil shape as seen from above, and in their "neutral" position are disposed at an angle to the forward flight direction. This configuration causes the yaw paddles to produce a dragging force on the helicopter in forward flight. This drag helps stabilize the helicopter during forward flight, making it easier to control, and keeping it pointing forward. This additional drag is not considered a significant hindrance to flight because the helicopter is designed to fly at relatively low speeds (e.g. about 30 mph). It will be apparent otherwise that the yaw paddles could make the craft difficult to handle in windy conditions.

The yaw paddles 30, 32 are preferably formed of a fiber/resin composite skin and a foam core laminate composite which is rigid, yet lightweight. Aluminum alloy brackets 225 are used to support the paddles and, with the pivot arm 234, to transfer control inputs to them causing them to tilt as described.

As will be appreciated the rotor craft 10 is configured for ease of control in flight, and not necessarily for maximizing speed, altitude, responsiveness, etc. in the illustrated embodiment. A goal is to make the aircraft easier to learn to fly, and easier and more forgiving in controlling it in flight rather than optimizing for speed or other parameters usually emphasized. It is contemplated that this will make the device more attractive for use in a greater number of applications, by a greater number of people, as they need not have extensive training and constant practice to fly safely. It is contemplated that the aircraft be flown relatively low, and relatively slow, say about 40 knots at an upper end of the speed performance envelope. The aircraft will thus allow ranchers, rangers, recreational users, military personnel, law enforcement, and other potential classes of users to be able to fly more readily, and only occasionally, when required or desired.

The helicopter of the present invention can be adapted to employ a fly-by-wire control system. All control functions—engine/rotor speed, tilt of the rotors, and rotation of the yaw paddles—are thereby effectuated by servoactuators actuated under the control of an electronic controller. The electronic controller receives control input from the flight controls, including the control panel 36, control stick 38, and throttle 40, which are manipulated by the operator, and are disposed on the airframe 12 within convenient reach of an operator seated in the operator seat 34.

The control panel 36 preferably includes a conventional key-operated ignition switch 252, and a variety of indicators and gauges 254, as desired, for monitoring the functions of the craft. These may include engine rpm and fuel level gauges, electrical and safety system indicator lamps, and even attitude, altitude, and heading indicators, etc.

The throttle lever 40 in one embodiment is a twist grip throttle. This is similar to that used in motorcycles, snowmobiles, etc. This could also be used in a conventional stick control, where yaw control is by foot peddles, and the throttle is atop the stick. Alternatively, the throttle can be a foot peddle, and the yaw control can be by turning a twist-grip atop an otherwise more conventional stick. In another embodiment the throttle can comprise a lever which is hingedly connected to the airframe via a motion sensor just below and to the rear of the operator seat. When the operator pulls the free end of the lever up, the motion sensor detects the amount of rotation, and sends a corresponding signal to the controller, which opens the throttle proportionally, increasing the power output of the engine. When the operator lets the end of the throttle lever down, the throttle is proportionally closed in the same manner, reducing engine output.

The control stick 38 may take many forms. One form which the inventors prefer is a handlebar configuration, as shown in the FIGs. The handlebar-type control stick includes an upright post 260, and a transverse handlebar 262 mounted to its top. The bottom end of the upright post is connected to the forward boom by a hinged connector 264 or plurality of connections, which allows motion of the upright support in two or three degrees of freedom: the upright post can pivot forward and backward, and side-to-side, and may also rotate about its longitudinal axis. The forward/backward motion of the post is detected by a pitch sensor (not shown), and the side-to-side motion of the post is detected by a roll sensor (not shown), both of which are disposed in the connector 264 at the bottom of the post. A yaw sensor (not shown) detects rotation of the handlebar. The handlebar may alternatively be fixedly connected to the upright post, with the rotation sensor disposed at the base of the post. Consequently, rotation of the handlebar causes axial rotation of the upright post, which actuates the yaw paddles to control yaw of the helicopter.

The sensors (not shown) convert the relative motion of the stick and handlebar into electrical impulses which are received by the electronic controller. Pivoting of the control stick, forward or backward, or side-to-side, controls the rotor tilt actuators, which control the pitch and roll of the helicopter. Rotation of the handlebar controls the motion of the yaw paddles, causing the craft to yaw left or right. The combination of pitch, roll, and yaw control using the control stick, and lift control through the throttle control, provides complete operational control of the helicopter through a very simple and intuitive scheme which is easy for operators to learn, even those without any prior flying experience.

It will be apparent that other control configurations may also be used. For example, a moveable yoke with a rotatable steering wheel similar to that used in airplanes could be used for pitch and roll control, with foot pedals attached to the forward boom for yaw control. Any combination of operator actuatable controls which will allow independent control of the flight functions of the aircraft may be used.

As noted above, the helicopter can employ a fly-by-wire control system. While the operator manipulates the flight controls in that embodiment, these manipulations do not directly control the servoactuators which actuate/articulate the helicopter's flight control components. Instead, all control functions are governed by the electronic controller (not shown). The electronic controller receives signals from the motion sensors connected to the flight controls, and determines exactly what commands should be sent to the helicopter systems. This electronic control system allows the operator to effect desired movement of the helicopter, but continually keeps the craft stable regardless of the pilot input, and does not allow the operator to perform certain actions which would endanger the aircraft and which can be anticipated and prevented.

For example, control software in the controller may set a maximum descent rate. Accordingly, if the operator quickly lowers the throttle lever to a point which would otherwise cut power to the engine if the throttle lever were directly connected thereto, the controller will not entirely close the throttle to stop the engine, but will slow the engine only enough to allow a reasonable maximum safe rate of descent. Similarly, if the operator were to attempt to roll the craft suddenly in a manner which ordinarily might cause it to become unstable, the controller would nevertheless send signals to the appropriate systems to roll and turn the helicopter approximately as directed, without allowing a loss of control. While no control system can anticipate all possible dangerous maneuvers, and operators still must watch for and avoid hazards, this system makes control of a relatively difficult type of aircraft simple for those without extensive training.

To control the forward or backward motion of the helicopter, the operator tilts the control stick 38 forward or backward (relative to the axis of the airframe), this motion being detected by the pitch sensor. The signal produced by the pitch detector is transmitted to the electronic controller 250, where it is converted into signals for actuating one or both of the rotor control actuators to cause the rotor set to tilt forward or backward. To control roll of the helicopter, the operator tilts the control stick to the right or left, this motion being detected by the roll sensor 268, which sends a signal to the electronic controller. The electronic controller converts the roll signal into signals for actuating one or both of the rotor control actuators to cause the rotor set to tilt to the right or left side.

To control yaw of the helicopter, the operator rotates the handlebar to the right or left, or twists joystick to the right or left, this motion being detected by the yaw sensor 270. A signal indicative of the rotation of the handlebar travels to the electronic controller 250, which in turn sends signals to the yaw paddle servo for causing the yaw paddles to rotate one direction or the other. The user can thus easily control lift by manipulating the throttle lever 40, or throttle control button 278, and controls the forward, backward, side to side, and rotational motion of the helicopter by means of the control stick. Adjustability of control sensitivity is also provided.

The simplified electronic control system described controls all functions of the helicopter in response to pilot input. By not using heavy levers, cables, pulleys, etc., the electronic control system greatly reduces the weight of the helicopter. At the same time, the fly-by-wire system allows for advanced functions like auto-hover, cruise-control, etc., and can be programmed to help prevent certain operator errors, as discussed above.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A rotorcraft, comprising:
   an airframe having a top and a bottom;
   a rotor attached to the airframe adjacent the top of the airframe;
   a four-stroke engine vertically mounted to the airframe adjacent the bottom of the airframe;
   a driveshaft extending between the engine and a location adjacent the top of the airframe, said driveshaft being coupled to the rotor adjacent the top of the airframe; and
   a plurality of pulleys carried by the airframe, one being operably coupled to the driveshaft, and one being operably coupled to the rotor, and a continuous belt operably coupling the pulleys;
   wherein the pulley coupled to the driveshaft is positioned aft of the pulley coupled to the rotor.

2. A rotorcraft as set forth in claim 1, further comprising a sprag configured to allow the rotor to turn without being powered by the engine.

3. A rotorcraft as set forth in claim 2, further comprising a centrifugal clutch configured to cooperate with the sprag to allow the engine to turn at a different speed than the driveshaft.

4. A rotorcraft as in claim 1, wherein the rotor is a coaxial rotor set pivotably connected to the airframe, and power to the rotor is transmitted through a constant velocity joint.

5. A rotorcraft, comprising:
   an airframe having a top and a bottom;
   a rotor attached to the airframe adjacent the top of the airframe;
   a four-stroke engine vertically mounted to the airframe;
   a driveshaft extending between the engine and a location adjacent the top of the airframe,
   a plurality of pulleys carried by the airframe, one of the pulleys being operably coupled to the driveshaft and another of the pulleys being operably coupled to the rotor, wherein the pulley coupled to the driveshaft is positioned aft of the pulley coupled to the rotor; and,
   a continuous belt operably coupling at least the pulley coupled to the driveshaft and the pulley coupled to the rotor.

6. A rotorcraft as set forth in claim 5, wherein the pulley operably coupled to the rotor is larger than the pulley operably coupled to the driveshaft, a rotational speed reduction being thereby enabled.

7. A rotorcraft as set forth in claim 5, wherein the driveshaft is disposed vertically and the continuous belt is disposed horizontally.

8. A rotorcraft as set forth in claim 5, wherein the driveshaft is formed of a lightweight composite material.

9. A rotorcraft as set forth in claim 5, wherein the rotorcraft further comprises a sprag disposed between the engine and the rotor, the sprag being configured to allow the rotor to turn without being powered by the engine.

10. A rotorcraft as set forth in claim 5, wherein rotorcraft further comprises a centrifugal clutch disposed between the engine and the rotor, the centrifugal clutch configured to cooperate with the sprag and the rest of the rotorcraft to allow the engine to turn at a different rotational speed than the driveshaft.

11. A rotorcraft as set forth in claim 5, wherein rotorcraft further comprises a CV joint disposed between the engine and the rotor, enabling the rotor to be tilted with respect to the airframe about at least roll and pitch axes.

12. A rotorcraft as set forth in claim 5, wherein the rotorcraft further comprises a coaxial rotor set.

13. A rotorcraft as set forth in claim 12, further comprising a transmission disposed between the pulley connected to the rotor and a lower rotor of the coaxial rotor set, the transmission being configured to divide power between rotors of the coaxial rotor set.

14. A rotorcraft as set forth in claim 5, wherein the airframe includes a lightweight composite material.

15. A rotorcraft as set forth in claim 14, wherein the airframe includes a vertical frame member comprising said composite material and a forwardly extending boom extending forward of the vertical frame member, forming generally an L-shape with a bottom of the L-shape extending forward.

16. A rotorcraft as set forth in claim 15, wherein the driveshaft and the continuous belt form an upside down L-shape, with a horizontal part of the L-shape extending forwardly.

* * * * *